July 25, 1933.　　　　L. A. CAMEROTA　　　　1,919,199
CONVEYER FOR CYLINDRICAL OBJECTS
Filed Jan. 13, 1932　　　　4 Sheets-Sheet 1
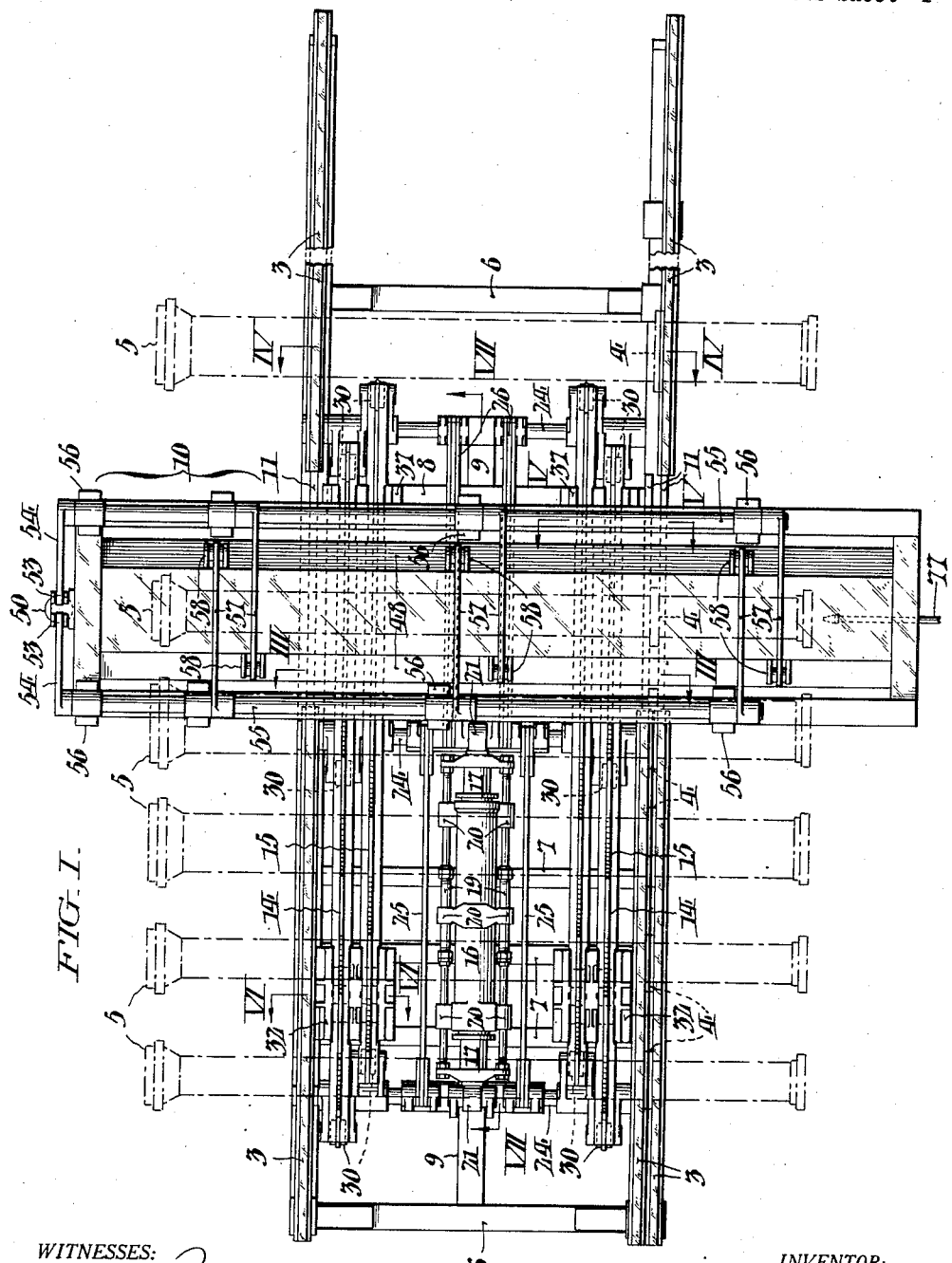

July 25, 1933.  L. A. CAMEROTA  1,919,199
CONVEYER FOR CYLINDRICAL OBJECTS
Filed Jan. 13, 1932  4 Sheets-Sheet 2
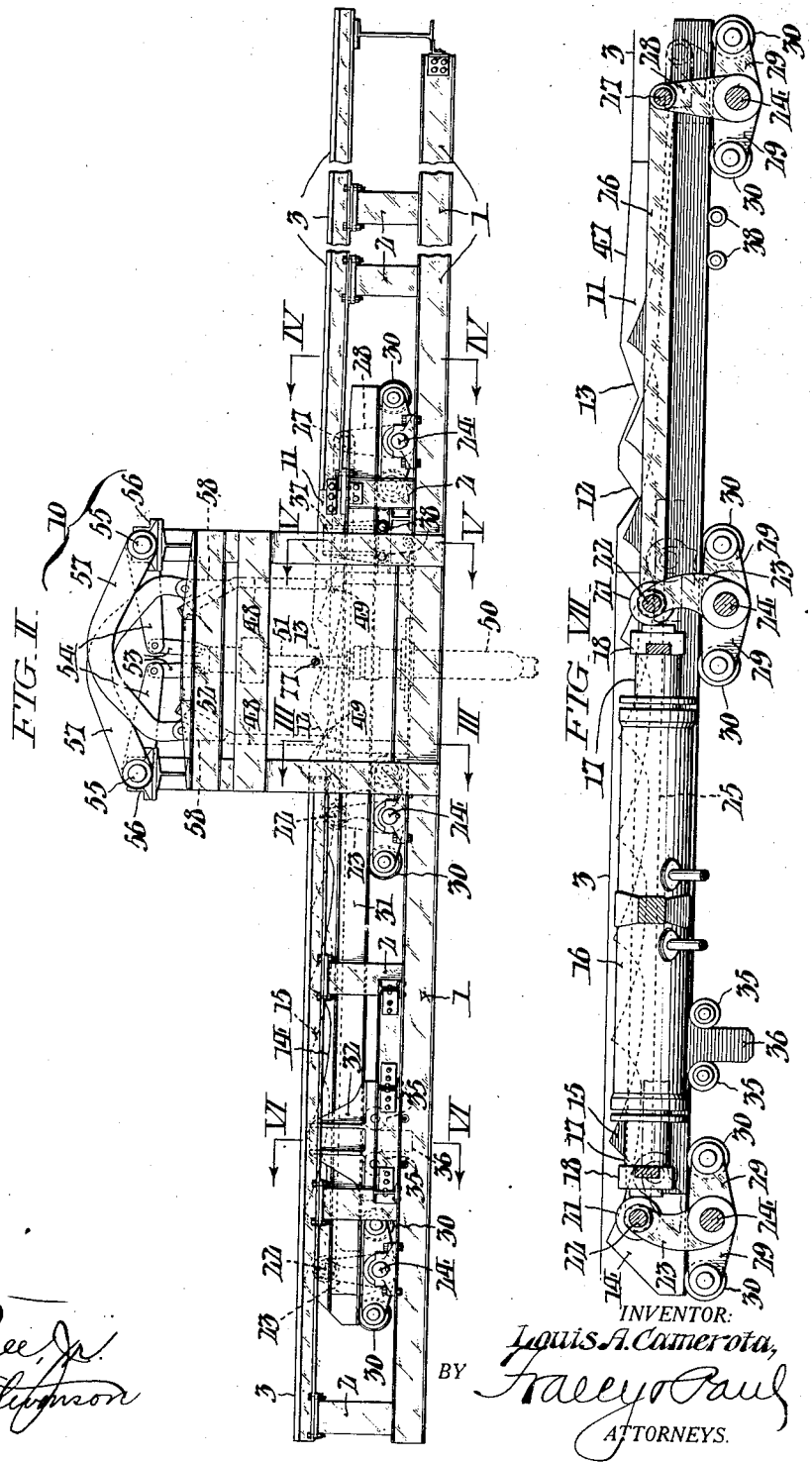
INVENTOR:
Louis A. Camerota,
BY
ATTORNEYS.
WITNESSES:

July 25, 1933.   L. A. CAMEROTA   1,919,199
CONVEYER FOR CYLINDRICAL OBJECTS
Filed Jan. 13, 1932   4 Sheets-Sheet 3
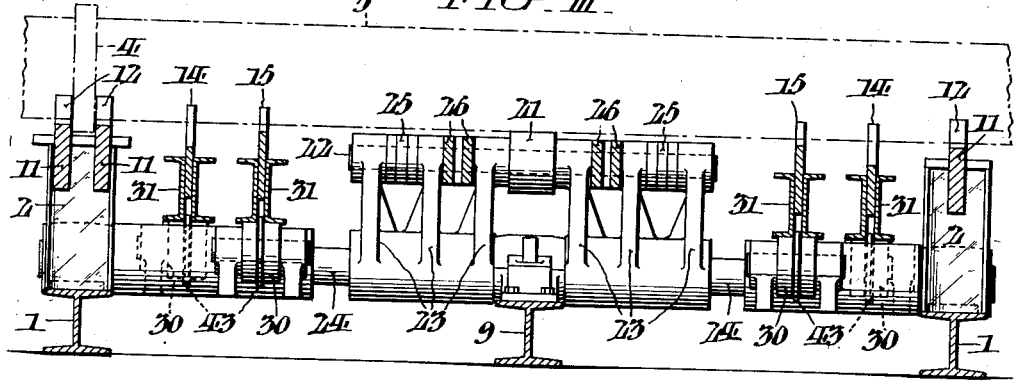
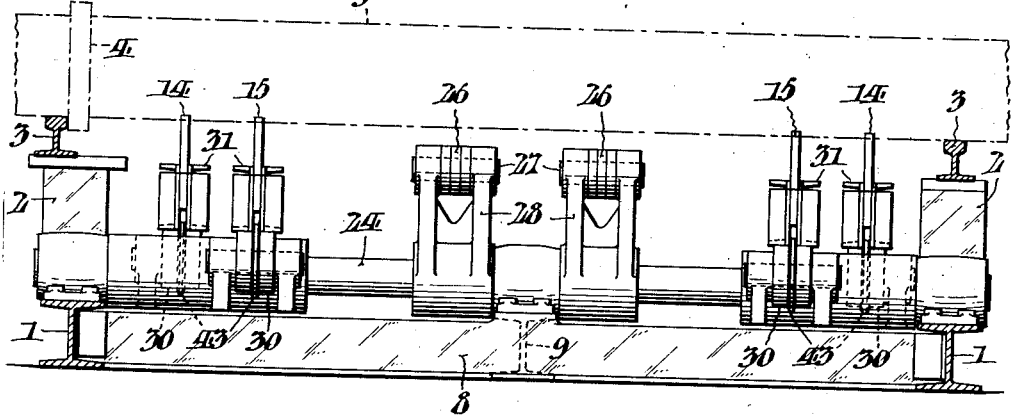
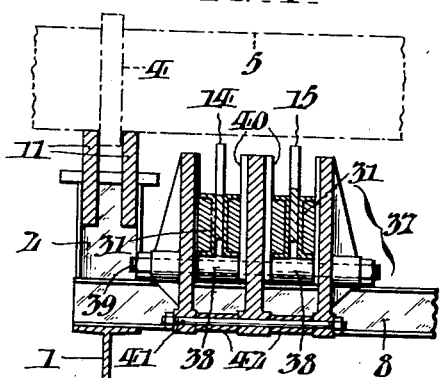
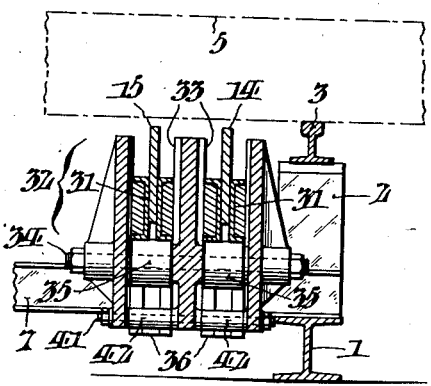

July 25, 1933.  L. A. CAMEROTA  1,919,199
CONVEYER FOR CYLINDRICAL OBJECTS
Filed Jan. 13, 1932  4 Sheets-Sheet 4
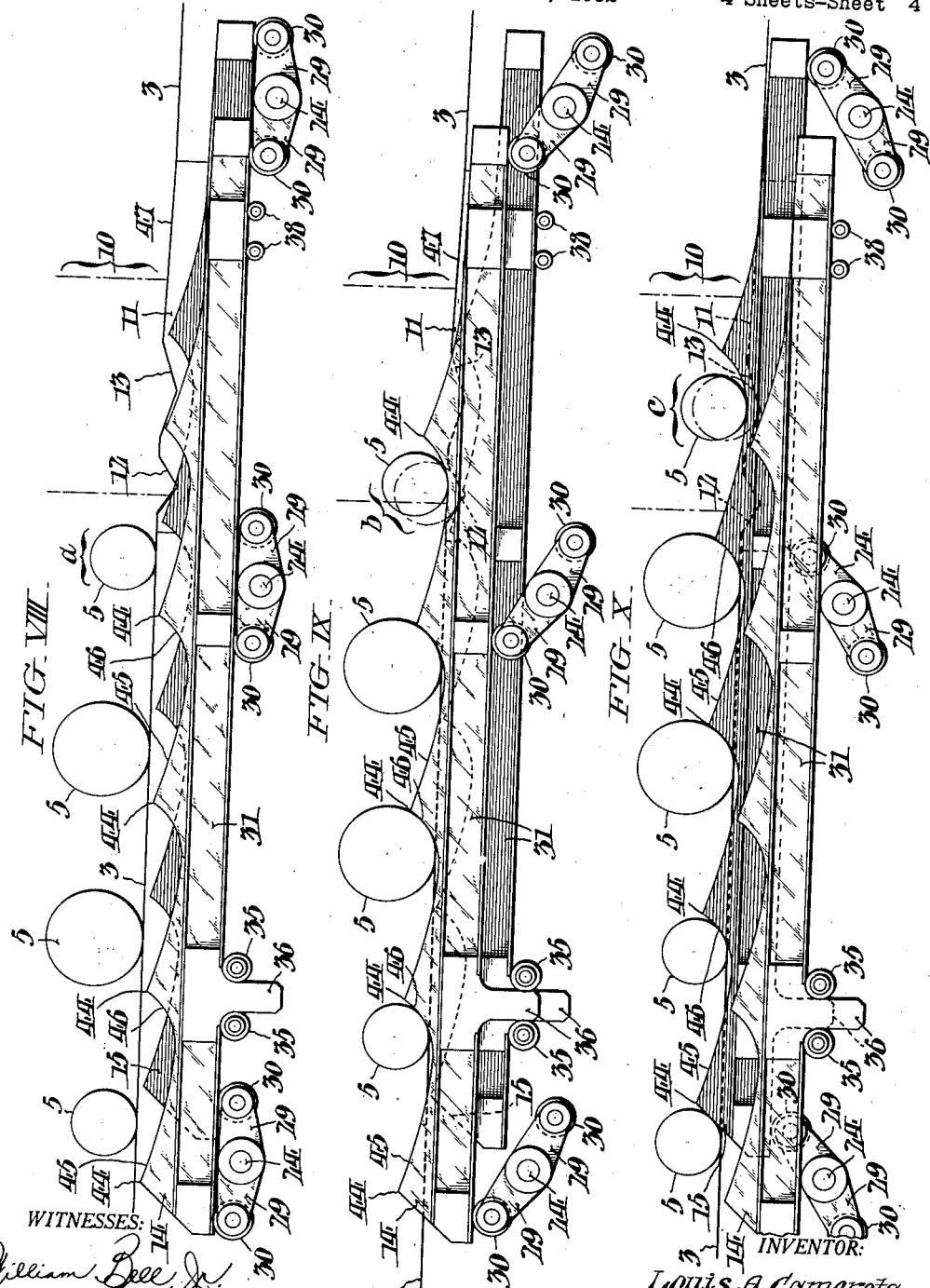
INVENTOR:
Louis A. Camerota,
BY
ATTORNEYS.

Patented July 25, 1933

1,919,199

UNITED STATES PATENT OFFICE

LOUIS A. CAMEROTA, OF BURLINGTON, NEW JERSEY, ASSIGNOR TO WALTER WOOD, OF PHILADELPHIA, PENNSYLVANIA

CONVEYER FOR CYLINDRICAL OBJECTS

Application filed January 13, 1932. Serial No. 586,316.

My invention, while relating generally to conveyers for cylindrical objects, has particular application to the progression of pipes or pipe flasks in a foundry. Heretofore it has been proposed to roll pipes or pipe flasks from one station in a foundry to another by means of spaced parallel rails affording an elevated horizontal rolling surface. Difficulty has been experienced, however, with the rolling of large cylindrical objects in this manner: partly because slight variations in their outside diameters at different points of their length, due to imperfection of manufacture or to the accumulation of dirt or scale, will prevent the rolling of the objects with their axes maintained in a truly transverse direction to the supporting rails; and partly because of the tendency of one such object to jamb against another. At certain stations in a pipe foundry, for example at a station where the molds are disintegrated to free pipes from their flasks, it may be desirable to admit the flasks individually and to center them in a predetermined position before performing the desired operation thereon.

Accordingly, the primary object of the present invention is to provide a conveyer with mechanical means for progressing a series of pipe flasks or other cylindrical objects from one station to another with intermittent rolling movement and with each object maintained at a spaced distance from the next object and with its axis truly perpendicular to the longitudinal axis of the conveyer.

Another object of the invention is to provide in such a conveyer means for temporarily arresting rolling movement of a pipe flask or other cylindrical object at a predetermined point where the objects may be individually subjected to a particular operation and thereafter discharged for further movement towards another station.

In its preferred form the conveying apparatus of this invention is also characterized by the provision of reciprocating skids loosely mounted in guides so that they may be readily removed or replaced as occasion demands. Other objects and advantages characterizing my invention will become more fully apparent from the description hereinafter of one embodiment or example of the practice thereof, having reference to the accompanying drawings. Of the drawings:

Fig. I represents a plan view of a conveyer adapted for the progression of pipe flasks in a foundry.

Fig. II represents a side elevation of the same.

Fig. III represents a cross section of the same, taken as indicated by the lines III—III of Figs. I and II.

Fig. IV represents a cross section of the same, taken as indicated by the lines IV—IV of Figs. I and II.

Fig. V represents a cross section of the same, taken as indicated by the lines V—V of Figs. I and II Fig. VI represents a cross section of the same, taken as indicated by the lines VI—VI of Figs. I and II.

Fig. VII represents a longitudinal section of the same, taken as indicated by the lines VII—VII of Fig. I; and, Figs. VIII, IX, and X represent diagrammatically the successive positions occupied by the reciprocating skids and a series of pipe flasks on the conveyer.

In the drawings, with particular reference to Figs. I and II, there is shown a stationary framework or table comprising I-beams 1 resting on a foundry floor and arranged in parallel spaced relation, pedestals 2 mounted thereon, and parallel rails 3 supported on and secured to the pedestals 2. At one side of the table, two such rails 3 are preferably employed so as to accommodate between them flanges 4 on the pipe flasks 5, whereby the pipe flasks may be guided in their rolling movement along the rails. To stiffen the table, as well as to provide a suitable support for the operating mechanism of the conveyer, transverse beams 6, 7 and 8, and a longitudinal center beam 9, are provided.

It may be assumed for the purpose of illustration that the rails 3 receive pipe flasks 5 from a transfer car at that end of the table which is shown at the left hand of Figs. I and II, and that the conveyer is used for mechanically progressing the flasks to a dust collecting enclosure comprising a mold disintegrating station, designated comprehensively at 10, where their movement is momentarily arrested, and from thence to a pipe stripping station at the other end of the table. At the mold disintegrating station, rail sections 11 of special formation, as clearly shown in Figs. II and VII, are provided, and these sections are notched at 12 and 13 with V-shaped grooves, one set of notches 12 being at the entrance to the dust collecting enclosure 10 of the mold distintegrating station and the other set 13 being at the center of this enclosure. The notches 12 and 13 are employed for accurately centering each flask before its admission to the enclosure 10 and while it is within the enclosure 10. The necessity of maintaining the flasks with their axes truly perpendicular to the rail sections 11 at the mold disintegrating station will become apparent from the description of the preferred method and apparatus used for performing the mold disintegrating operation which is to be found in U. S. Letters Patent No. 1,774,082, granted to me August 26, 1930.

The apparatus for imparting movement to the flasks 5 to cause their intermittent progression along the rails 3 comprises, generally, movable skids 14, 15 arranged in pairs at opposite sides of the table, and an actuating cylinder 16 having plungers 17 and associated mechanism for causing reciprocatory movement of the skids 14, 15.

The cylinder 16, in which any suitable hydraulic or pressure medium may be employed, is mounted on the transverse beams 7 centrally of the table with its plungers 17 disposed at opposite ends. Crossheads 18 at the ends of the plungers 17 are connected together by guide rods 19 bearing in stationary guides 20. Each crosshead 18 bears upon a roller 21 mounted on an auxiliary shaft 22 which in turn is carried by a crank arm 23 on a main rock shaft 24. Connecting rods 25 joining one auxiliary shaft 22 with the other cause simultaneous rocking movement of the crank arms 23. Additional connecting rods 26 join one auxiliary shaft 22 with a corresponding shaft 27 carried by crank arms 28 on a third rock shaft 24 disposed at a distance from the cylinder 16. Accordingly, the three rock shafts 24 rotate simultaneously with reciprocatory movement of the plungers 17, first in one direction, and then in the other direction.

Each rock shaft 24 carries at the ends thereof pairs of oppositely disposed crank arms 29 with bifurcated ends provided with rollers 30. When the plungers 17 of the cylinder 16 are in their normal positions of rest, the top surfaces of the rollers 30 lie in a common horizontal plane beneath the base portions of the skids 14, 15.

Secured to the transverse beams 7 at opposite sides of the conveyer table, near its receiving end, are guide brackets 32 which have vertical surfaces 33 between which the base portions 31 of the skids 14, 15 are accommodated, as shown in Fig. VI. On stationary shafts 34, carried by the guides 32, idle rollers 35 are mounted in pairs. Between the pairs of rollers 35 depending projections 36 of the skids 14, 15 are engaged, as shown in Fig. VII. The rollers 35 thus serve to prevent longitudinal shifting of the skids 14, 15 while allowing the skids to be reciprocated vertically within the guides 32. Additional guide brackets 37 carrying rollers 38 on shafts 39 are secured near the discharge end of the conveyer table upon the transverse beams 8. The latter guide members 37, which have vertical surfaces 40 between which the base portions of the skids 14, 15 are accommodated, as shown in Fig. V, serve merely to prevent lateral shifting of the skids 14, 15 incident to their elevation and depression. The parts of the guide members 32 and 37 are held together in proper spaced relation by bolts 41 and spacing members 42.

It will be noted, as shown in Figs. III and IV, that the rollers 30 have annular flanges 43 thereon which project into grooves at the base portions of the skids 14, 15, and hence assist in preventing lateral shifting of the skid supports. The base portions of the skids preferably comprise channel beams 31 disposed back to back with the skids 14, 15 held therebetween. Furthermore, the skids 14 and 15, together with the channel beams 31 may be readily removed by merely lifting them from their seats in the guide members 32 and 37, and thus the replacement or repair of a skid is a comparatively simple matter.

Each skid 14, 15 comprises a flat plate having a succession of curved recesses at its top edge. From each pointed hump 44 there is an inclined surface 45 leading downward and forward with a gradual curve and merging with an inclined surface 46 leading upward and forward with more abrupt inclination to the next succeeding hump 44. When the plungers 17 of the cylinder 16 are at rest, the skids occupy the position shown in Figs. II, VII and VIII. In this position the bottom flanges of the channel beams 31 of the skids 14, 15 rest on the idle rollers 35 at the guide brackets 32 and on the idle rollers 38 on the guide brackets 37. The movable rollers 30 on the crank arms 29 are in this position disposed in alignment with each other in a horizontal plane, and are also in contact with the base flanges of the channel beams 31. The pointed humps 44 of the skids 14, 15 are beneath the top surface of the rails 3, and no portion of the curved surfaces 45 and 46 extends above the notches 12 and 13 at the mold disintegrating station. As pressure is admitted to the cylinder 16, each double stroke of the plungers 17 causes reciprocating movement of a skid 14, 15. First one skid is lifted so that its top surface extends above the rails 3 and is depressed, and then the other skid is elevated and depressed in the same manner.

The alternate reciprocation of the skids 14 and 15 causes a progression of the flasks 5 in the following manner. Assuming that the conveyer is at rest and that a series of flasks 5 occupy the positions shown in Fig. VIII, elevation of the skid 14 to the position shown in Fig. VIII will cause each flask to be rolled forward in spaced relation to the other flasks. Thus a flask originally occupying the position shown at a in Fig. VIII will be pushed forward to the position shown at b in Fig. IX. It will be noted, however, that the movement of the skid 14 to its elevated position does not transfer the weight of the flask 5 from the rails 3 but merely imparts to the flash a rolling movement causing the same to travel along the rails until it strikes the abruptly inclined surface 46. The gradually inclined surfaces 45 are preferably curved slightly so that the striking of the skid 14 against a flask will not cause the same to be moved with a kick, but will impart, by gradual application, a rolling movement to the flasks. I have found that curved surfaces, shown as shown at 45, will cause a flask to roll with a minimum of effort. Obviously, the power required to roll flasks in this manner is considerably less than that required to carry their weight while progressing them forward.

As the skid 14 descends and the skid 15 ascends to the positions shown in Fig. X, the flask 5, which originally occupied the position shown at a in Fig. VIII, and which was later moved to the position shown at b in Fig. IX, is now moved to the position shown at c in Fig. X, by reason of its engagement with the curved surface 45 of the skid 15. Accordingly, with each double stroke of the plungers 17 a new flask 5 is moved into the dust collecting enclosure 10. As a flask is rolled into the notches 12 at the entrance to the mold disintegrating station, its position on the rails 3 will be corrected so that its axis is truly perpendicular to the rails. This perpendicular relation between the flask and the rails will be maintained with further movement of the flask into the notches 13 where the flask is centered within the enclosure 10 of the mold disintegrating station. At the notches 12 and 13, the skids 14 and 15 serve to lift the flasks out of the notches and then to continue their rolling movement. In the example shown in the drawings, the rail sections 11 at the mold disintegrating station are provided with downwardly and forwardly inclined surfaces 47 beyond the notches 13. Accordingly, after the flasks are progressed beyond the notches 13, they are caused to roll by gravity towards the discharge end of the table.

From the above description it will be apparent that reciprocation of the skids 14 and 15 effects an intermittent rolling movement of the flasks 5 along the table in spaced relation to each other, and that this movement is temporarily arrested at the notches 12, and thereafter at the notches 13 where the flasks are accurately centered for a mold disintegrating operation, before further rolling movement to the end of the table. Any tendency of a flask to swerve in its movement on the rails 3, and thus to occupy a position not truly transverse to the rails, is corrected as the flask finishes its downward movement on the gradually inclined surfaces 45 of the skids 14, 15 and strikes the abruptly inclined surfaces 46 at the back of the next succeeding hump 44.

The dust collecting enclosure 10, or "blow box" as it is conveniently called, wherein the refractory molds of the pipe flasks are disintegrated, includes movable doors 48 which, as shown in Fig. II, normally rest upon sills 49. To operate the doors 48, a pressure cylinder 50 is employed, the cylinder having a plunger 51 with a head 52 to which links 53 are pivoted. The links 53 are in turn pivoted to the arms 54. Each arm 54 is attached to a shaft 55 extending along the top of the blow box from one end to the other and supported in bearings 56. To the shaft 55 there are attached at spaced intervals additional arms 57, the ends of which are pivoted to brackets 58 on the doors 48. In an obvious manner movement of the plunger 51 will cause the doors 48, through the above described linkage, to be opened or closed together, by vertical movement away from the sills 49.

While I have described a particular mechanism for effecting alternate reciprocation of the conveyer skids, it will be apparent that various changes may be made in the form of this mechanism, as well as of other parts of the conveyer, without departing from the spirit of my invention.

Having thus described my invention, I claim:

1. A conveyer for cylindrical objects of the character described comprising a table having a flat surface, skids having inclined surfaces movable to positions above and beneath said table, and means for reciprocating said skids to effect intermittent rolling movement of the objects along said table in spaced relation to each other.

2. A conveyer for cylindrical objects of the character described comprising a table, skids having a succession of smoothly curved recesses and movable to positions above and beneath said table, and means for reciprocating said skids to effect intermittent rolling movement of the objects along said table in spaced relation to each other.

3. A conveyer for cylindrical objects of the character described comprising a table, skids having curved surfaces of gradual downward and forward inclination merging with curved surfaces of abrupt upward and forward inclination and movable to positions above and beneath said table, and means for reciprocating said skids to effect intermittent rolling movement of the objects along said table in spaced relation to each other.

4. A conveyer for cylindrical objects of the character described comprising a table in the form of spaced parallel rails, skids arranged in pairs at opposite sides of said table and having inclined surfaces movable to positions above and beneath said rails, and means for imparting reciprocatory motion alternately to one skid of a pair and then to the other, to effect intermittent rolling movement of the objects along the rails in spaced relation to each other.

5. A conveyer for flanged cylindrical objects comprising a table having spaced parallel rails upon which said objects are adapted for longitudinal progression guided by their flanges, skids arranged in pairs at each side of said table and movable to positions above and beneath said rails, and means for reciprocating said skids to effect intermittent rolling movement of the objects thereon in spaced relation to each other.

6. A conveyer for cylindrical objects of the character described comprising a table affording a rolling surface for said objects and having means for temporarily arresting such rolling movement at a predetermined point, skids movable to positions above and beneath said table, and means for elevating and depressing said skids to effect intermittent rolling movement of the objects to said predetermined point and to lift said objects for movement beyond said point.

7. A conveyer for cylindrical objects of the character described comprising a table affording a rolling surface for said objects and having a depression therein for temporarily arresting such rolling movement, skids movable to positions above and beneath said table, and means for elevating and depressing said skids to effect intermittent rolling movement of said objects along said table to said depression and to lift said objects at said depression whereby their rolling movement may be continued beyond said depression.

8. A conveyer for cylindrical objects of the character described comprising a table having spaced parallel rails affording a rolling surface for said objects, said rails having notches therein for temporarily arresting rolling movement of said objects and having sloping surfaces beyond said notches, skids movable to positions above and beneath the top of said rails and having inclined surfaces, and means for reciprocating said skids to effect intermittent rolling movement of said objects along said rails to said notches and to lift said objects at said notches thereby to continue their rolling movement along the sloping surfaces of said rails.

9. A conveyer for cylindrical objects of the character described comprising a table affording a flat rolling surface for said objects, skids having a succession of inclined surfaces and arranged in pairs at the sides of said table with their surfaces normally below the rolling surface of the table, each skid of a pair being adapted for simultaneous operation with a skid of the other pair, and means for alternately elevating and depressing each skid of a pair to push said objects along said table in spaced relation from each other.

10. A conveyer for cylindrical objects of the character described comprising a table affording a flat rolling surface, vertical guides on said table, skids adapted for reciprocatory movement within said guides, said skids having a succession of inclined surfaces movable to positions above and beneath said table to effect intermittent rolling movement of the objects therealong, and rocker arms for reciprocating said skids within said guides to effect intermittent rolling movement of the said objects along said table in spaced relation from each other.

11. A conveyer for cylindrical objects of the character described comprising a table affording a flat rolling surface, guides on said table, skids adapted for reciprocatory movement within said guides to positions above and beneath said table to effect intermittent progression of the objects thereon in spaced relation to each other, and means for actuating said skids including crank arms having rollers adapted to bear upon the base portions of said skids.

LOUIS A. CAMEROTA.